United States Patent [19]

Armstrong

[11] 4,226,920
[45] Oct. 7, 1980

[54] EXPANDED ZINC ELECTRODE FOR DRY CELLS

[75] Inventor: William A. Armstrong, Ottawa, Canada

[73] Assignee: Her Majesty the Queen in right of Canada, as represented by the Minister of National Defence, Ottawa, Canada

[21] Appl. No.: 51,234

[22] Filed: Jun. 22, 1979

[30] Foreign Application Priority Data

Oct. 20, 1978 [CA] Canada ................................. 313887

[51] Int. Cl.$^2$ ............................................. H01M 6/10
[52] U.S. Cl. ...................................... 429/94; 429/229; 429/247
[58] Field of Search ..................... 429/94, 229–231, 429/224, 165, 129, 130, 246, 247

[56] References Cited

U.S. PATENT DOCUMENTS

| | | | |
|---|---|---|---|
| 1,486,172 | 3/1924 | Wilhelm | 429/94 |
| 3,069,486 | 12/1962 | Solomon et al. | 429/229 |
| 3,198,668 | 8/1965 | Schneider | 429/229 X |
| 3,281,271 | 10/1966 | Comanor et al. | 429/94 |
| 3,951,687 | 4/1976 | Takomura et al. | 429/94 |
| 4,049,882 | 9/1977 | Beatty | 429/94 |
| 4,091,178 | 5/1978 | Kordesch | 429/94 X |

*Primary Examiner*—Anthony Skapars
*Attorney, Agent, or Firm*—Cushman, Darby & Cushman

[57] ABSTRACT

The invention disclosed relates to an anode structure for use in dry cells, particularly in low temperature environments. The novel anode is constructed of a perforated electrochemically active material and wound to form a coil. Spacer means is provided to maintain substantially uniform spacing between adjacent layers of the coil.

12 Claims, 5 Drawing Figures

EXPANDED ZINC ELECTRODE FOR DRY CELLS

BACKGROUND OF THE INVENTION

This invention relates to electrodes for use in cylindrical electrochemical cells at low temperature.

The problem concerns the low coulombic efficiency of conventional zinc electrodes when they are discharged at low temperatures. In the case of the alkaline zinc/manganese dioxide battery, for example, the duration of discharge at low temperatures is limited by a rapid passivation of the zinc electrode. This passivation is caused by a building up during discharge at low temperatures of a dense layer of zinc oxide on the surface of planar zinc electrodes or within the pores or porous electrodes.

U.S. Pat. No. 3,205,097 which issued on Sept. 7, 1965 to R. R. Clune et al., describes a zinc electrode for medium low temperature operation comprised of a corrugated strip of zinc, the corrugations being deep enough to accommodate the zinc oxide formed during discharge. Usefulness of the electrode is limited to temperatures above $-20°$ F.

A variety of methods for making porous zinc electrodes with improved characteristics at $-20°$ C. have been described in the literature. It has been found however, that the major source of passivation is the formation of insoluble zinc oxide within the electrode pores. Because the solubility of the zinc oxide in the electrolyte decreases with decreasing temperature, porous electrodes have limited capacity at low temperatures. This source of passivation also adversely affects the discharge at low temperatures of electrodes prepared by compression molding of zinc fibers and needles.

In applicant's co-pending U.S. application, now U.S. Pat. No. 4,175,168, a zinc electrode prepared by folding in a zigzag fashion a strip of expanded or woven zinc to which had been attached narrow spacer bars also of expanded or woven zinc, was developed recently for rectangular (prismatic) cells. However, such a design is not suitable for use in cyclindrical cells, the configuration in which alkaline zinc/manganese dioxide cells are usually manufactured. In conventional cylindrical cells, the anode and cathode are separated by insulating battery separators. However, no means is provided for maintaining substantially uniform spacing of adjacent layers of a coiled anode.

DETAILED DESCRIPTION OF THE INVENTION

According to one aspect of the invention, an anode for use in a cylindrical electrochemical cell is contemplated, comprising (a) a strip of a perforated electrochemically active material, said strip being wound in the form of a coil, and (b) spacer means providing substantially uniform spacing between adjacent layers of the coil.

According to another aspect of the invention, a cylindrical electrochemical cell is contemplated, said cell comprising (a) a cylindrical casing, (b) an anode according to the invention disposed in said casing, (c) a cathode arranged about said anode, (d) insulating separator means separating the anode and cathode, and (e) an electrolyte of suitable concentration.

In applicant's aforementioned co-pending application, adjacent layers of the anode are separated by spacers which are also of the perforated electrochemically active material.

Since the anode spacer is preferably in the form of an integral strip of material, it would be impractical to use the perforated electrochemically active material as the spacer, since these materials are generally somewhat brittle and could break when coiled. A resilient spacer material is thus preferred. The spacer material is preferably an electrically conducting material and thus serves as a current collector.

It will be appreciated that spacer means may also be constructed of an electrically insulating material, in which case, alternate current collecting means must be provided. Further, as alternative spacing means, a spiral groove may be provided in the ends of the cylindrical battery casing. The spacer means preferably includes three spaced strips attached to the anode by spot welding and for this reason, brass is preferred as spacer material. Other resilient electrically conducting materials which are resistant to corrosion by the KOH electrolyte may also be used.

The mesh size of the electrochemically active material, preferably zinc, must be sufficiently fine to give an electrode with a very high surface area but coarse enough to accommodate the building up of zinc oxide during the discharge and also to allow convective flow of electrolyte through the electrode even at low temperatures where the electrolyte is more viscous than at normal ambient temperatures. Expanded zinc of mesh size of about 3/0 to 6/0 and thickness of about 0.007 inch to 0.019 inch is preferred.

The spacer strips must be thick enough to permit an adequate flow of electrolyte between adjacent layers of the electrode. Brass strips of about 0.001 to 0.005 inch in thickness, preferably 0.003 inch, were found to be suitable. The width of the strips is conventionally about ⅛ inch, although the width is by no means critical.

A detailed description of the manufacture of a zinc anode for incorporation into AA-size cells follows. All of the components of this cell except the zinc electrode are substantially the same as those used in commercial cells. The expanded zinc replaces the "wet mix" of powdered zinc and potassium hydroxide normally used as the anode.

BRIEF DESCRIPTION OF THE DRAWINGS

In the drawing which serves to illustrate embodiments of the invention.

DETAILED DESCRIPTION OF THE DRAWINGS

Figure 2:
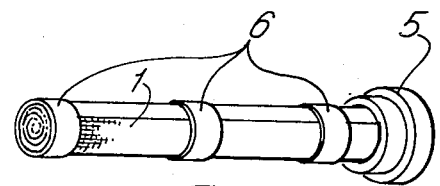
FIG. 2 is a perspective view of a finished anode according to the invention.

Referring to the drawing, a zinc anode according to the invention is manufactured by coiling a rectangular strip 1 of expanded or woven zinc to which has been attached by spot welding, three spaced brass strips 2, which serve to maintain substantially uniform spacing between adjacent layers of the coil. Two of the brass strips extend beyond the length of the rectangular strip 1 and provide tongues 3 for spot welding to a current collecting nail 4. A closure member 5 of a suitable plastics material e.g. Teflon ® is mounted on the nail 4 for closing one end of the battery casing (not shown). As seen in FIG. 2, the anode is held in coiled arrangement by circular sleeves 6, conveniently of a suitable inert plastics material e.g. Acropor which is a microporous fabric comprising nylon coated with Dynel ® a co-polymer of vinyl chloride and acrylonitrile.

Specifically, the nail 4 is hammered half way through an AA battery sized plastic cap 5. A drop of biwax (an asphaltic compound) is placed on the plastic cap and the nail is hammered the rest of the way through the cap. The biwax thus seals the cap-nail interface. The nail is flattened at two places to facilitate spot welding to tongues 3. The assembly is degreased with trichloroethylene and then dried with methanol.

To assemble the anode, the screen 1 (expanded metal-Exmet 6 Zn 7-6/0, 0.009" thick, cut to $3\frac{1}{4}" \times 1\frac{3}{4}"$, weight $2.0\pm0.19$) and three brass strips 2 (0.003" thick $\times \frac{1}{8}"$ wide, one cut $3\frac{1}{4}"$ length, other two $3\frac{3}{4}"$ length) are first degreased in trichloroethylene and dried with methanol. The brass strips 2 are then attached to the screen 1, conveniently by spot welding, the strips being spaced and arranged parallel to each other and to the longitudinal axis of the rectangular screen material. The nail 4 is then spot welded to the protruding tongues 3 and the strip 1 is coiled about the nail 4 with the brass strips 2 on the inside. The diameter of the coil should be about 0.260" in diameter to accommodate the AA size cell. As the coiling is effected, it is necessary to release the welds in order to prevent rippling of the screen. Plastic sleeves 6 (Acropor $7\frac{1}{8}"$ wide) serve to maintain the tightness of the coil and hence the positioning of the spacers.

The resulting anode structure is then amalgamated in a suitable manner. An appropriate amalgamating solution comprises 7.5 g red HgO dissolved in 5% ethylenediaminetetraacetic acid (EDTA) in a 500 ml. beaker. The pH is adjusted to 10 with KOH. Specifically, 1. Space twelve anodes evenly on a rack, hanging from the caps.
2. Suspend the rack-electrode assembly in such a way that the amalgamating solution completely covers the expanded zinc. Maintain in this position for 30 minutes, while stirring with a magnetic stirring bar.
3. Remove the rack-electrode assembly from the amalgamating solution and place it in a beaker containing 250 ml of electrolyte for 5 minutes, with no stirring.
The electrolyte will become cloudy, and a fine black suspension will be observed. After being allowed to settle overnight, the solution becomes clear, and the solids on the bottom are seen to consist of yellow HgO particles.
4. Remove the rack-electrode assembly and immerse in 500 ml deionized water for 10 minutes, stirring with a magnetic stirring bar.
5. Repeat the deionized water wash (Step 4) three more times or until the pH of the wash water drops below 7.
6. Remove the rack-electrode assembly and immerse in 500 ml methanol for 30 minutes, stirring with a magnetic stirring bar.
7. Repeat step 6.
8. Remove rack-electrode assembly and dry overnight in a vacuum oven.

Amalgamated electrodes were found by analysis to have a mercury content of 1.5-2.5%, an amount sufficient to give an acceptable gas rate for battery cell manufacture.

Figure 1:
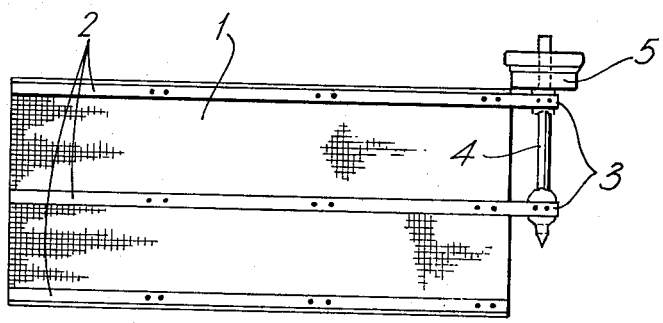
FIG. 1 is a side elevation illustrating the anode construction according to the invention.
Figure 3:
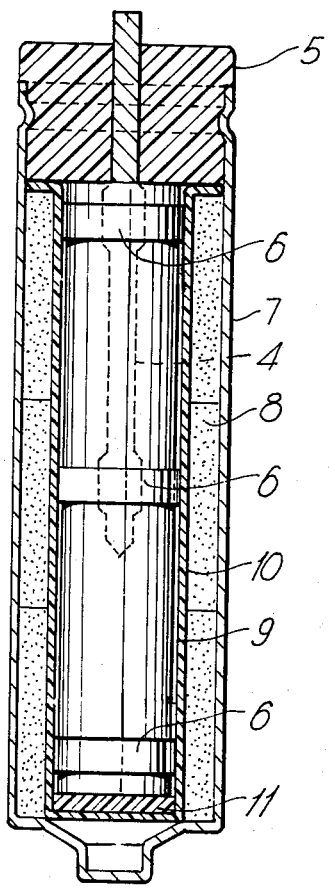
FIG. 3 is a side elevation in section of an electrochemical cell according to the invention.

With reference to FIG. 3, a conventional open-ended AA sized can 7 is provided. Three annular de-polarizer (cathode) pellets 8 are fitted inside the can 7 to define a control chamber 10. The pellets are made from $MnO_2/C$ wet mix of manganese dioxide, graphite and 9N KOH. An insulating battery separator 9 constructed of (PVA-Viskon ® a non-woven battery separator material) provided to separate the anode from cathode 8. A spacer disc 11 of a suitable plastics material e.g. Teflon is inserted into the bottom of the chamber 10. The anode is then inserted part way into the chamber 10. 1.5 ml of electrolyte is added. (31% KOH, 2% ZnO). The electrolyte is permitted to absorb. The remaining 0.5 ml of electrolyte is added. Wait 1 to 2 minutes. Insertion of the anode into chamber 10 is completed, cap 5 closing the open end of can 7. The can is then crimped to close, washed with dilute acetic acid, rinsed with methanol and dried.

Figure 4:
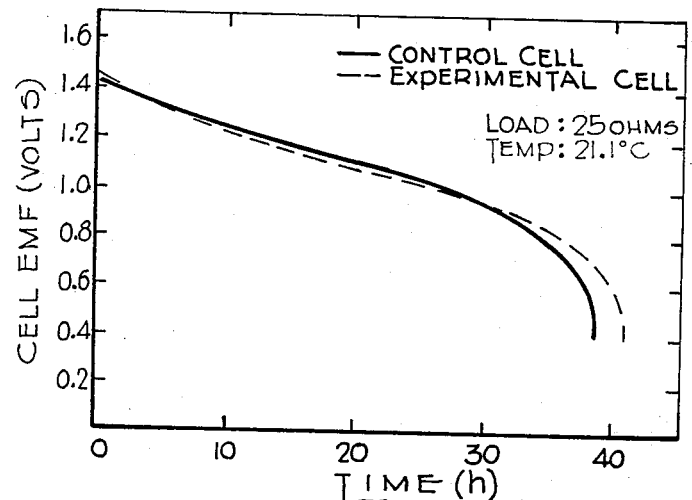
FIGS. 4 and 5 are graphs illustrating the performance of electrochemical cells equipped with anodes according to the invention.
Figure 5:
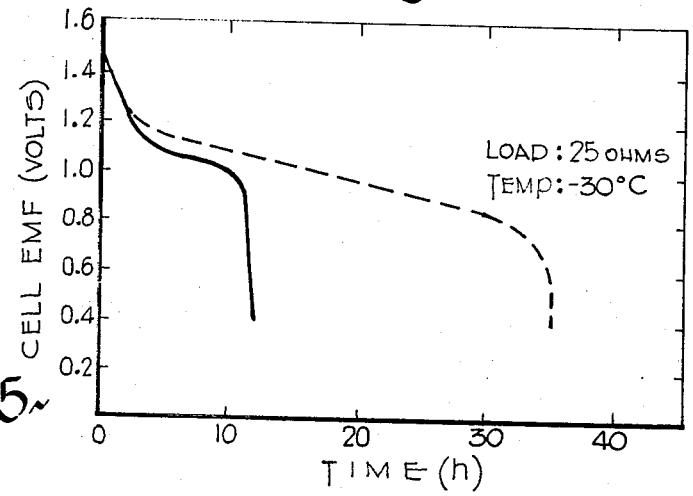

In FIGS. 4 and 5, the performance of cells equipped with expanded zinc electrodes according to the invention is compared with that of cells having conventional zinc anodes for continuous discharge into a 25 ohm load. At 21° C. (FIG. 4) discharges were very similar in terms of cell voltage and duration but at $-30°$ C. (FIG. 5), the cell with the expanded zinc anode exhibited a slightly higher operating voltage and a much greater duration of discharge than the control cell.

It should be noted that this improved zinc electrode may be used not only with a manganese dioxide cathode in alkaline zinc/manganese dioxide cells but also with any of the cathode materials commonly coupled with zinc in cylindrical battery cells. Examples of such cathodes are the mercuric oxide, silver oxide, nickel oxide and oxygen electrodes.

The configuration we have described of an expanded metal equipped with spacer strips and wound into a coil in such a manner that the spacer strips ensure a uniform space between the layers of the coil is applicable to other metals capable of being expanded or woven and commonly used as anodes in batteries. Aluminum, magnesium, iron and their alloys are examples.

A higher rate cell could presumably be made by coiling together an $MnO_2$ cathode, a suitable separator material and an expanded zinc anode to which had been attached non-conducting spacers in such a matter that, upon coiling, a uniform space is maintained between the expanded zinc and the adjacent layer of cathode material. This method of construction was considered. However, it is doubtful whether the improved performance would justify the additional expense involved in constructing such a cell.

The embodiments of the invention in which an exclusive property or privilege is claimed are defined as follows:

1. An anode for a cylindrical electrochemical cell, comprising
   (a) a sheet of a perforated electrochemically active material, said sheet being wound in the form of a coil, and
   (b) spacer means providing substantially uniform spacing between adjacent layers of the coil, said spacer means being in the form of a resilient stripshaped material attached to said sheet material, the thickness of said strip being about 0.001 to 0.005 inch to permit adequate flow of electrolyte between said adjacent layers.

2. An anode according to claim 1, wherein said perforated electrochemically active material is in the form of a screen of a mesh size of about 6/0 to 3/0.

3. An anode according to claim 2, wherein said resilient strip material is electrically conducting.

4. An anode according to claim 3, wherein said spacer means comprises three equally spaced, parallel strips, arranged parallel to the longitudinal axis of said sheet of electrochemically active material.

5. An anode according to claim 4, wherein said spacer means is constructed of brass.

6. An anode according to claim 5, wherein the thickness of the spacer strips is about 0.003 inch.

7. An anode according to claim 6, wherein the electrochemically active material is amalgamated by dipping in a suitable mercuric salt solution after coiling.

8. An anode according to claim 7, wherein the amalgamated electrochemically active material includes about 1.5 to 2.5%/w of mercury.

9. An anode according to claim 1, 4 or 8, wherein the electrochemically active material is zinc.

10. A cylindrical electrochemical cell, comprising
  (a) a cylindrical casing,
  (b) an anode as defined in claim 1 disposed in said casing,
  (c) a cathode arranged about said anode,
  (d) insulating separator means separating the anode and cathode, and
  (e) an electrolyte of suitable concentration.

11. A cylindrical electrochemical cell according to claim 10, comprising
  (a) a cylindrical casing,
  (b) an anode including (i) a sheet of perforated expanded zinc of a mesh size of about 6/0 to 3/0, wound in the form of a coil, and (ii) a brass spacer strip about 0.003 inch in thickness providing substantially uniform spacing between adjacent layers of the coil,
  (c) a manganese dioxide cathode arranged about said anode,
  (d) an insulating separator means separating the anode and cathode, and
  (e) KOH of suitable battery concentration as electrolyte.

12. An anode according to claim 1, wherein said perforated electrochemically active material is in the form of expanded metal.

* * * * *